US007747810B2

(12) United States Patent
Uemura et al.

(10) Patent No.: US 7,747,810 B2
(45) Date of Patent: Jun. 29, 2010

(54) ADDRESS ASSIGNING METHOD, DISK DRIVE, AND DATA WRITING METHOD

(75) Inventors: Tetsuya Uemura, Saitama (JP); Hideki Saga, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 761 days.

(21) Appl. No.: 11/645,254

(22) Filed: Dec. 21, 2006

(65) Prior Publication Data

US 2007/0186029 A1   Aug. 9, 2007

(30) Foreign Application Priority Data

Jan. 4, 2006   (JP)   ............................. 2006-000193

(51) Int. Cl.
*G06F 12/00* (2006.01)
(52) U.S. Cl. ...................... 711/4; 711/200; 711/218; 711/E12.002
(58) Field of Classification Search ..................... 711/4, 711/200, 218
See application file for complete search history.

(56) References Cited

U.S. PATENT DOCUMENTS

| 6,185,063 | B1 | 2/2001 | Cameron | |
|---|---|---|---|---|
| 2004/0136104 | A1* | 7/2004 | Chiao et al. | 360/31 |
| 2005/0270678 | A1* | 12/2005 | Uchida | 360/63 |
| 2006/0020779 | A1* | 1/2006 | Rothman et al. | 713/2 |
| 2007/0277243 | A1* | 11/2007 | Horii et al. | 726/26 |

FOREIGN PATENT DOCUMENTS

| CN | 1553436 | 12/2004 |
|---|---|---|
| WO | WO 99/45534 | 9/1999 |

OTHER PUBLICATIONS

Microsoft Windows XP Professional, 2002.*
The State Intellectual Property Office of the People's Republic of China, Office Action for Application No. 200610172101.2, dated Nov. 21, 2008, 9 pages total.
American National Standards Institute, Information Technology—SCSI Object-Based Storage Device Commands (OSD), Project T10/1355-D, downloaded from: <<http://t10.org/ftp/t10/drafts/osd/osd-r10.pdf>> Printed on Jul. 30, 2004, pp. 1-171.

* cited by examiner

*Primary Examiner*—Sheng-Jen Tsai
*Assistant Examiner*—Michael C Krofcheck
(74) *Attorney, Agent, or Firm*—Townsend and Townsend and Crew LLP; Patrick Duncan

(57) ABSTRACT

Embodiments in accordance with the present invention enable a disk drive of an address system to write data normally, wherein track groups of different track widths are discretely disposed on the storage medium in a same disk drive and the dimensional relationship among physical block addresses of a sector is valid for the dimensional relationship among logical block addresses. Track groups are managed corresponding to their respective track width in a disk drive and for disposing successively in a logical block address space the respective track groups located discretely on the physical block address space.

2 Claims, 8 Drawing Sheets

| ZONE | FROM_PBA | TO_PBA | TRACK_PER_SECTOR |
|------|----------|--------|------------------|
|      |          |        |                  |
|      |          |        |                  |
|      |          |        |                  |
|      |          |        |                  |
|      |          |        |                  |
|      |          |        |                  |
|      |          |        |                  |

Fig.9

| ZONE (801) | FROM_PBA (901) | TO_PBA (902) | FROM_LBA (903) | TO_LBA (904) |
|---|---|---|---|---|
| | | | | |
| | | | | |
| | | | | |
| | | | | |
| | | | | |
| | | | | |
| | | | | |

Fig.10

| ZONE (801) | #BAND (1001) | #TOTAL (1002) |
|---|---|---|
| | | |
| | | |
| | | |
| | | |
| | | |
| | | |
| | | |

ADDRESS ASSIGNING METHOD, DISK DRIVE, AND DATA WRITING METHOD

CROSS-REFERENCE TO RELATED APPLICATION

The instant nonprovisional patent application claims priority to Japanese Patent Application No. 2006-000193, filed Jan. 4, 2006 and incorporated by reference herein for all purposes.

BACKGROUND OF THE INVENTION

Embodiments in accordance with the present invention relate to a method of assigning logical block addresses and a data writing method of a disk drive, in particular, to an assigning method of logical block addresses, a disk drive, and a data writing method where a plurality of track widths exist.

One of the methods to improve the recording density of a disk drive is to reduce the track width and track density. A means for achieving these objects is to miniaturize the write and read heads of the disk drive. The miniaturization of these heads enables data to be written on a track of a narrower width, and the reduction of track width leads to improvements in track density. The write and read head is fixed on the arm, and its arm is driven by a voice coil motor. Because of the mechanical structure of driving the arm by the voice coil motor, the displacement of the arm is subject to errors resulting in the write head jutting out of the track into which writing is made into both sides of the track at the time of writing on the track and the destruction of data. In order to prevent such destruction of data, the interval between two tracks is kept larger than the track width to secure a write margin. An approximately 10-percent margin is secured for the write margin on both sides of a track hindering the improvement of track density. Any disk drive in which data are written arbitrarily in a sector requires write margins on both sides of each track. However, the adoption of a sequential writing mode enables one side of the write margins to be deleted, and therefore the track density can be improved to that extent. In other words, even if the same write head, read head, or storage medium is used, the capacity of the disk drive can be improved by approximately ten percent.

As the interval between two tracks cannot be made narrower than the width of the write head according to the ordinary writing method of the disk drive, the write head width determines the minimum track interval. Accordingly, in order to improve the capacity of a disk drive to an extent farther than the deletion of a write margin, a method of reducing the track width to narrower than the width of a write head is required. Such methods disclosed by the U.S. Pat. No. 6,185,063 and W099/45534 reduce the track width rather than the write head width by partially overwriting data on the adjacent tracks.

U.S. Pat. No. 6,185,063 proposes two methods called "write seldom format" and "paired format" as partially overwriting methods on tracks. The "write seldom format" improves the reduction ratio of track width by partially overwriting data alternatively on a plurality of tracks instead of disabling to overwrite data in a random order on any arbitrarily chosen track. On the other hand, the paired format causes the reduction ratio of track width fall instead of enabling overwriting data in a random order on an arbitrarily chosen track by partially overwriting data on two adjacent tracks.

Ordinary disk drives recognize only linear address spaces represented by the logical block address (LBA) and do not recognize the logical structure of data such as file and directory. As a result, the file system in the operating system (OS) of high-order devices manages the logical structure of data and the arrangement of data in the disk drive. On the other hand, in the disk drive supporting the object based device commands (OSD) described in the T10/1355-D information technology—SCSI OSD (refer to SCSI Object Based Device Commands (OSD), incorporated by reference herein for all purposes, the disk drive can understand the data structure by offloading a part of the functions of the file system on the disk drive side. In other words, according to OSD the data (objects) written in a disk are recognized not by LBA but by the object ID.

BRIEF SUMMARY OF THE INVENTION

Embodiments in accordance with the present invention enable a disk drive of an address system to write data normally, wherein track groups of different track widths are discretely disposed on the storage medium in a same disk drive and the dimensional relationship among physical block addresses of a sector is valid for the dimensional relationship among logical block addresses. Track groups are managed corresponding to their respective track width in a disk drive and for disposing successively in a logical block address space the respective track groups located discretely on the physical block address space.

For a more complete understanding of the present invention, reference is made to the following detailed description taken in conjunction with the accompanying drawings.

BRIEF DESCRIPTION OF THE DRAWINGS

FIG. 9 is a definition table of the TT region according to the address assigning method in accordance with an embodiment of the present invention.

FIG. 10 is a table of band number in the zone according to the address assigning method in accordance with an embodiment of the present invention.

DETAILED DESCRIPTION OF THE INVENTION

Figure 1:
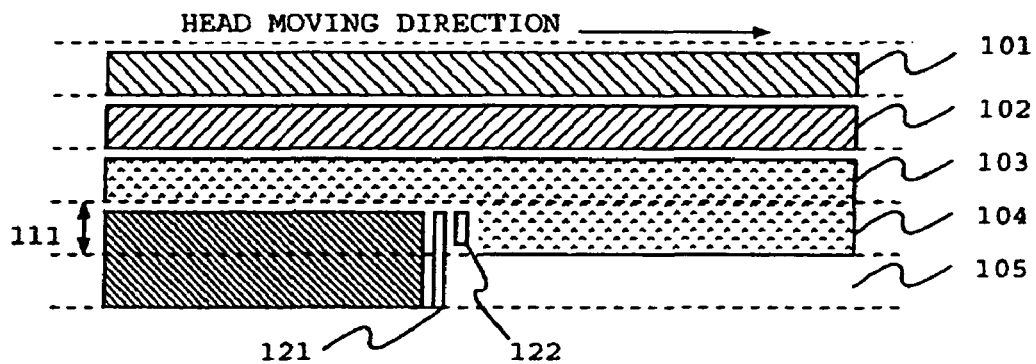
FIG. 1 is a schematic illustration describing the track disposition in the case of partially overwriting adjacent tracks in accordance with an embodiment of the present invention.

Embodiments in accordance with the present invention provide for enabling a disk drive of an address system to write data normally, wherein track groups of different track widths are discretely disposed on the storage medium in a same disk drive and the dimensional relationship among physical block addresses of a sector is valid for the dimensional relationship among logical block addresses. Track groups are managed corresponding to their respective track width in a disk drive and for disposing successively in a logical block address space the respective track groups located discretely on the physical block address space.

A disk drive having tracks on which data can be overwritten arbitrarily and tracks on which data cannot be overwritten arbitrarily, is described in U.S. Pat. No. 6,185,063. However, in the disk drive of U.S. Pat. No. 6,185,063, data cannot be written normally unless the disk drive has a configuration where the high-order device can know that the which track is one on which data can be overwritten arbitrarily, and which track is otherwise.

U.S. Pat. No. 6,185,063 discloses neither the means of informing the high-order device of the information on the constitution of the track, nor for which parts of the storage medium the tracks are constituted by the paired format or the write seldom format.

When tracks on which data can be arbitrarily overwritten and tracks on which data cannot be overwritten arbitrarily are created on the storage medium, there is no assurance that the respective tracks will be disposed on a continuous region on the storage device. For example, when data are read or written through a file system on a disk drive having a group of tracks on which data can be written arbitrarily and a group of tracks on which data cannot be written arbitrarily, meta data constituting the management information of files are recorded on a region where data can be overwritten arbitrarily, and the contents part of the file are stored in the region where data cannot be arbitrarily overwritten. At this time, if the regions where meta data are arbitrarily overwritten are concentrated in a location, the head must move over a long distance for the renewal of meta data resulting from the preparation or renewal of the file, resulting in the deterioration of the performance of the file system. For this reason, in order to improve the performance of a file system, it is desirable to dispose discretely the tracks in which data can be overwritten arbitrary on the storage medium.

When a high-order device accesses the storage medium of a disk drive that does not support OSD, it uses an address system called "logical block address" (LBA) to access the same. The disk drive translates the LBA specified by the high-order device into the physical block address (PBA) which is an address system within the disk drive and accesses the storage medium. There are defective sectors inaccessible due to defects in the production process in a storage medium. As the PBA is an address system for specifying arbitrarily chosen regions on a storage medium, the PBA is assigned even in defective sectors. As data cannot be written in defective sectors, and there is no sense in making them accessible from the high-order devices, the disk drive assigns LBAs to PBAs by proceeding to a skip process of assigning LBAs by skipping defective sectors. The defective sectors are managed by the primary defect LIST (PLIST). The number of sectors to which LBA are not assigned by the slip processing at the time of translating the LBA into the PBA, in other words offset is calculated by using the PLIST. As the skip process is a process of not assigning LBAs to the PBA of defective sectors, if, at the time when the LBA1 is assigned to the PBA1, and the LBA2 is assigned to the PBA2, if the LBA1<the LBA2, then the PBA1<PBA2. Even in a disk drive wherein arbitrarily rewritable tracks and tracks on which data cannot be overwritten arbitrarily coexist, similar relation develops between the LBA and the PBA when the LBA are assigned by the prior skip processing.

In other words, when tracks in which data can be overwritten arbitrarily are disposed discretely on the storage medium to improve the performance of the file system, the respective From LBA and the To LBA of the track group in which data can be overwritten arbitrarily and the respective From LBA and the To LBA of the track group on which data cannot be overwritten must be managed by a high-order device. Such a disk drive may be undesirable to use because the quantity of information to be managed is enormous.

Among the files to be recorded on the file system, there are files whose contents are rarely renewed such as music or movie and files whose contents are frequently renewed such as setting files or databases. Meta information constituting file management information renews the last access time every time when the file is accessed. To access the disk drive containing the tracks in which data can be arbitrarily overwritten and the tracks on which data cannot be overwritten through the file system, the contents portion of the files whose contents are rarely renewed should be disposed in the region where data cannot be arbitrarily overwritten and the contents portion of the files whose contents are frequently renewed and meta information should be disposed in the region where data are arbitrarily overwritten. As the question of on which part of the storage medium the meta information is to be disposed depends on the design of the file system, it is possible to dispose the meta information on a specific LBA, in other words on arbitrarily rewritable tracks. The file system is a system for reading and writing data without being conscious of the LBA of the disk drive, and has no function for disposing the contents portion of a file to any specific LBA. Therefore, it has a problem of being unable to assign the LBA in response to the frequency of renewal of files such as disposing the contents portion of a file whose contents are rarely renewed on tracks on which data cannot be arbitrarily overwritten and disposing the contents portion of a file whose contents are frequently renewed on tracks on which data can be arbitrarily overwritten.

One object of an embodiment of the present invention is to provide a method of assigning different LBAs respectively to arbitrarily rewritable tracks and tracks on which data cannot be arbitrarily overwritten and a disk drive to which the method can be applied.

Another object of an embodiment of the present invention is to provide a data writing method capable of writing data by selecting any one of the arbitrarily rewritable tracks or the tracks on which data cannot be arbitrarily overwritten depending on the frequency of renewal of files.

In order to achieve the objects of embodiments of the present invention, an address assigning method according to an embodiment of the present invention uses a disk drive with a storage medium and a controller that transmits/receives commands and data between the storage medium and a high-order device and controls write/read operations toward the storage medium. The storage medium includes a first track group having a first track width and a second track group having a second track width. The controller executes a first address assigning step for assigning logical block addresses to the first track group and a second address assigning step for assigning logical block addresses to the second track group.

In some embodiments, successive LBAs are assigned for each track group. Either successive LBAs may be assigned from the fixed start LBA for each track group, or the same may be assigned to different drives for each track group.

A disk drive according to an embodiment of the present invention includes a storage medium, a first track group having the first track width on the storage medium, a second track group having the second track width on the storage medium, a first address assigning means for assigning logical block addresses to the first track group, and a second address assigning means for assigning logical block addresses to the second track group. The first address assigning means assigns successive logical block addresses to the first track group, and the second address assigning means assigns successive logical block addresses to the second track group.

In some embodiments, at the time of making files having a file name with a specific prefix or suffix, the area for storing the contents portion of the file is secured only from either one of the first track group or the second track group.

In some embodiments, file entries having file names without specific prefix or suffix are made, and the access requests for file names without specific prefix or suffix are treated as requests for files with specific prefix and suffix.

In accordance with an embodiment of the present invention, the area for storing meta information constituting the management information of files with file name having a prefix or suffix is the above-mentioned first track group or the above-mentioned second track group same as the area for storing the contents portion.

The disk drive according to an embodiment of the present invention includes a means for identifying the objects to be recorded on the storage medium by object identifiers, records the objects having object identifiers of a first specific pattern on the first track group and records the objects having object identifiers of the second specific pattern on the second track group. The whole disk drive may be constituted in such a way that the question of whether an object identifier is that of the first specific pattern or that of the second specific pattern may be determined by the value of the specific bit of the object identifier.

According to an embodiment of the present invention, it is possible to minimize the information relating to the track group of different track widths of a disk drive to be managed by a high-order device. In disk drives of the same product series with difference only in the disk capacity, it is possible reduce information relating to track group of different track width to be managed. The contents portion of specific files can be disposed in a track group having a specific track width, and the storage capacity of a disk drive can be dynamically expanded by changing the ratio of track number of a track group of different track width depending on the condition of using the storage medium of the disk drive.

Embodiments of the present invention will be described with reference to drawings. Incidentally, the same reference number represents the same component element. The tracks partially overlapping the adjacent track are referred to as "shingled tracks (ST)," and the tracks without overlapping are referred to as "tiled tracks (TT)."

In accordance with one embodiment of the present invention, the TT regions and the ST regions disposed discretely in the PBA space are respectively assigned in the successive addresses in the LBA space.

FIG. 1 is a schematic illustration showing the track arrangement in the case of partially overwriting on the adjacent track. From the track 101 to the track 105, the tracks written by the write head 121 are partially overwritten, and a read head 122 having a narrower width than the write head 121 is used to read and thereby to make the track width 111 narrower than the width of the write head 121. In FIG. 1, after the track 103 is written, the track 104 is written. The writing on the track 104 causes the track 105 to be erased. Accordingly, when the adjacent tracks are partially overwritten, all the tracks within a certain range on which writing is to be started must be renewed. Such a track group is referred to as "a band."

Figure 2:
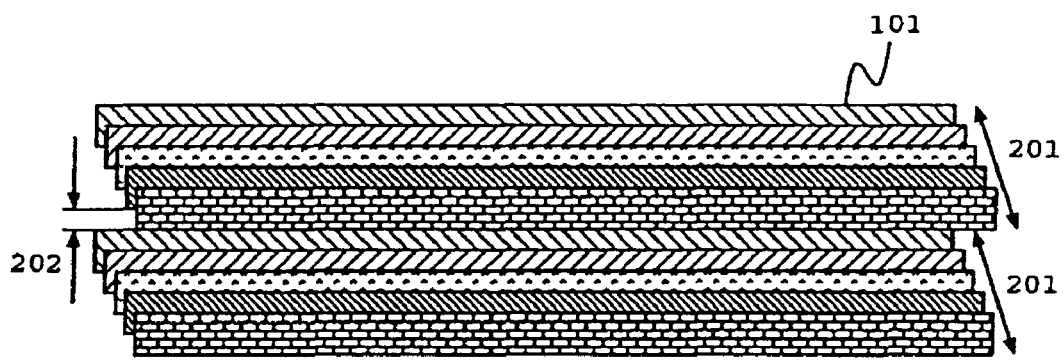
FIG. 2 is a schematic illustration describing the band structure composed of a plurality of successive tracks in accordance with an embodiment of the present invention.

FIG. 2 is a schematic illustration showing the structure of a band constituted by a plurality of successive tracks. In FIG. 2, the code 201 represents a band, and the code 202 represents a band gap for preventing the destruction of data between two bands. As shown in FIG. 2, only the track at the end of the band has a larger width and the creation of a region of the band gap 202 contribute to prevent the destruction of data at the adjacent band.

Figures 7, 8:
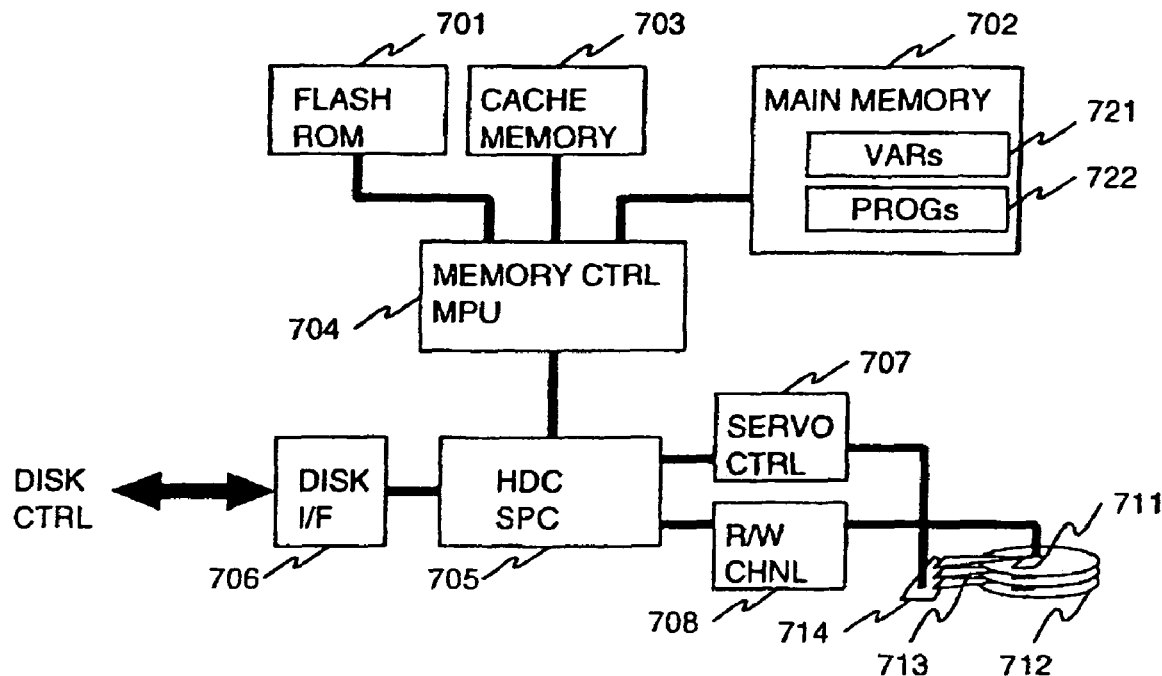
FIG. 7 is a block diagram of a disk drive in accordance with an embodiment of the present invention.
FIG. 8 is a zone definition table according to the address assigning method in accordance with an embodiment of the present invention.

FIG. 7 is a block diagram of the disk drive in accordance with an embodiment of the present invention. The flash ROM 701 stores programs necessary for starting the disk drive. The main memory 702 is used to store the control program and various data necessary for the control of the memory controller and the microprocessor 704. The cache memory 703 is used as the cache for data transmitted and received to and from the disk controller of a high-order device through a disk interface 706. The communication protocol used for communication with high-order devices is processed by the SCSI protocol controller unit of the hard disk controller and the SCSI protocol controller 705. The commands sent to the SCSI protocol controller are translated into the driving commands for the write head and the read head by memory controller and the microprocessor unit of the microprocessor 704. The translated driving commands are sent to the hard disk controller unit of the hard disk controller and the SCSI protocol controller 705. The hard disk controller controls the servo controller 707 and the read/write channel 708 based on the commands received, and executes the writing or reading of data on or from the storage medium. The servo controller 707 controls the voice control motor 714 so that the head 711 fixed at the top of the actuator arm 713 may move to the position of the sector to be read by the storage medium 712. After the head 711 has moved to the sector to be read, the read/write channel 708 executes the transmission and reception of data to the head 711. At this time, in the case of writing, the data stored in the cache memory 703 are written into the storage medium, and in the case of reading, the data stored in the storage medium are written into the cache memory 703.

When the disk drive is switched "ON," the memory controller and the microprocessor 704 read the starting program from the flash ROM 701. The memory controller unit initializes the main memory 702 and the cash memory 703, controls the servo controller 707 and the read/write channel 708 through the hard disk controller and the SCSI protocol controller 705 so as to read other control programs and various data necessary for the control programs from the storage medium of the disk drive. Then, the control programs and various data 721 that have been read are stored in the main memory 702. These control programs 722 include an address translation program. The address translation program includes an address translation program for the first track width and an address translation program for the second track width, and these are applicable to various modes shown in FIGS. 4, 5 and 6 described below. The data structure 721 will be described in FIG. 8, FIG. 9 and FIG. 10, and one of the control programs 722 will be described in FIG. 11.

Figure 3:
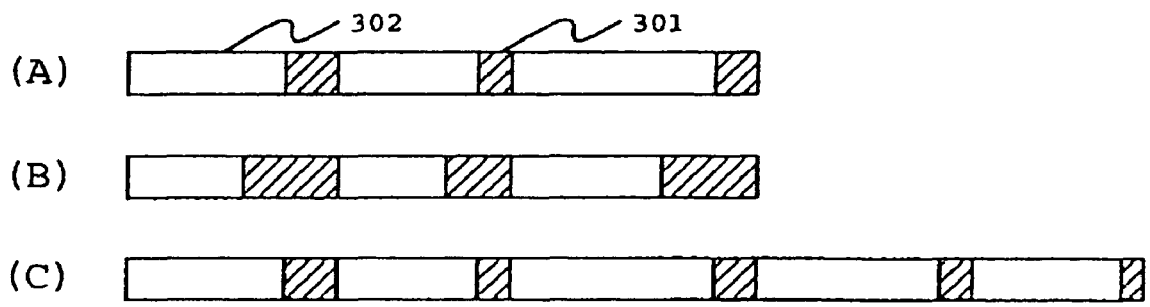
FIG. 3 is a schematic illustration describing the disposition of shingled tracks (ST) and tiled tracks (TT) in the physical block address space on the storage medium of the disk drive in accordance with an embodiment of the present invention.

FIG. 3 is a schematic illustration showing the disposition of Shingled Tracks (ST) and Tiled Tracks (TT) in the physical block address (PBA) space on the storage medium of a disk drive. The TT region 301 is a track writing method that does not overwrite partially on the adjacent tracks, and the ST region 302 is a partially overwritten adjacent track shown in FIG. 1. If FIG. 3(A) is the basic structure of the disk drive, FIG. 3(B) shows a structure wherein the TT region 301 is increased in relation to FIG. 3(A) in order to increase the sector where the data can be renewed at random, and FIG. 3(C) shows a structure wherein the capacity of the disk drive is increased in relation to FIG. 3(A).

Instead of the successive disposition of the TT region 301 and the ST region 302 on the storage medium, the respectively discrete disposition of the same as shown in FIG. 3 improves the access speed to the meta information of the file system and the efficiency of using the storage medium. As PBA is a system of coordinates that corresponds one-to-one with the position on the storage medium, the TT regions and the ST regions disposed discretely on the storage medium are disposed discretely in the same way also in the case of PBA.

According to the prior art, LBAs are assigned to sectors on a storage medium as described below. Specifically, the LBAs are assigned in the successive order from the top address sector of the PBAs. At this time, the LBAs are not assigned to defective sectors that cannot read or write normally, and a skip process is executed for assigning the LBAs originally intended to be assigned to the defective sectors to the normal sectors subsequent to the defective sectors. According to the assigning method of LBAs according to such prior art, the TT regions and the ST regions disposed discretely on the PBA address space are also disposed discretely in the LBA space. As high-order devices connected with a disk drive accesses the sectors on the storage medium of the disk drive by specifying the LBA, the high-order device must manage the start LBA and the end LBA for the whole region of the TT region 301 and the ST region 302 in order to write on the TT region and the ST region existing discretely on the LBA. Such a disk drive is problematic in that it is very uncomfortable to use from the viewpoint of the high-order device.

Figure 4:
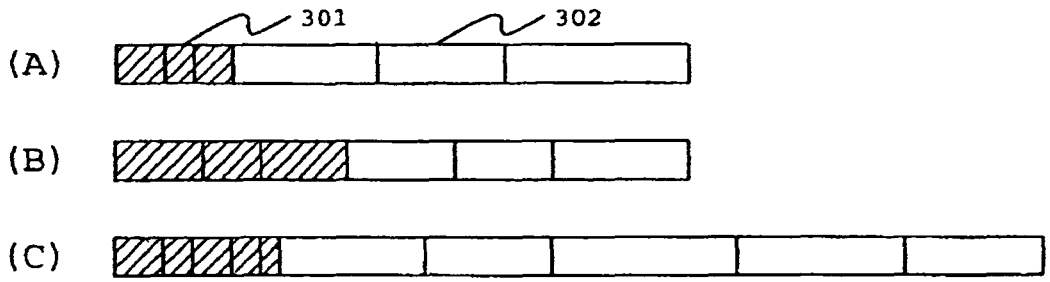
FIG. 4 is a schematic illustration describing the disposition of ST and TT in the logical block address space of the address assigning method in accordance with an embodiment of the present invention.
Figure 5:
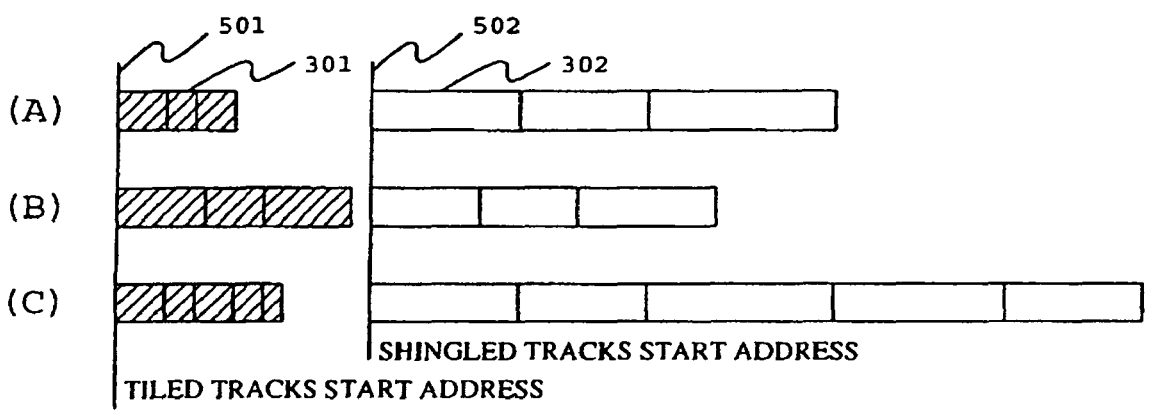
FIG. 5 is a schematic illustration describing the disposition of ST and TT in the LBA space of the address assigning method in accordance with an embodiment of the present invention.

Therefore, according to the address assigning method in accordance with an embodiment of the present invention, successive LBAs are assigned to the TT regions 301 and the ST regions 302 as shown in FIG. 4 or FIG. 5. FIG. 4 and FIG. 5 are schematic illustrations showing the disposition of ST and TT in the logical block address (LBA) space. (A), (B) and (C) of FIG. 4 and FIG. 5 correspond respectively to the disk drive of (A), (B) and (C) of FIG. 3 respectively.

According to the structure of FIG. 4, a plurality of TT regions 301 are successively assigned in the LBA space from the top of the LBA space, and a plurality of ST regions 302 are successively assigned from the LBA following the last address of the TT region 301 in the LBA space. By the structure of FIG. 4, the high-order device can write on the disk drive according to the present invention the total number of sectors of the TT region 301, or the From (start) LBA and the To (end) LBA of the TT region 301, and the total number of sectors of the ST region or the From (start) LBA of the ST region 302 simply by managing only the To (end) LBA. Unlike the structure of FIG. 4, the structure of FIG. 5 is characteristic in that the From (start) LBA 501 of the TT region 301 and the From (start) LBA 502 of the ST region 302 are identical irrespective of the capacity of the disk drive. This structure is advantageous in that the loading of the file system of the high-order device is facilitated.

Figure 6:
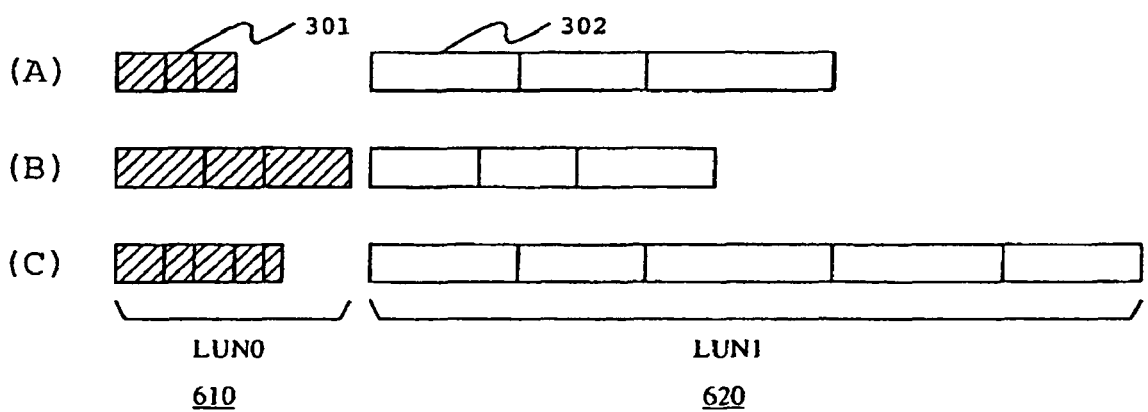
FIG. 6 is a schematic illustration describing the disposition of ST and TT in the LBA space of the address assigning method in accordance with an embodiment of the present invention.

Another assigning method of LBA is the structure described in FIG. 6. FIG. 6 is a schematic illustration of the disposition of ST and TT in the LBA space, the code 610 represents the logical drive with a logical unit number (LUN) 0 (LUN0) and the code 620 represents the logical drive with a LUN 1 (LUN1).

The structure of FIG. 6 is characteristic in that the TT region and the ST region are assigned to different logical drives. In other words, the TT region 301 is assigned to LUN0 610, and the ST region 302 is assigned to LUN1 620. This structure is advantageous in that, like the structure of FIG. 5, the loading of the file system of the high-order device is facilitated. In FIG. 6, the logical drive is identified by LUN1 620 based on the assumption of a SCSI HDD. However, on an ATA HDD, the logical drive is identified by a master/slave. As another loading method, the TT region 301 and the ST region 302 may be assigned respectively on different partition of the disk drive. The structures shown in FIG. 4 and FIG. 5 are described below.

The address assigning method according to an embodiment of the present invention and the data structure 721 used in an embodiment of the disk drive with reference to FIG. 8, FIG. 9 and FIG. 10 is described below.

FIG. 8 is a zone definition table in accordance with an embodiment of the present invention. The term "zone" means a region wherein the number of sectors in a track of the storage medium of the disk drive is equal. In the zone definition table of FIG. 8, each zone is registered as an entry. Each entry includes a zone number 801, a zone From PBA 802, a zone To PBA 803, and the number of sectors in the track of the zone 804.

FIG. 9 is a definition table of TT region in accordance with an embodiment of the present invention. The definition table of TT region defines a TT group for each entry. Each entry includes the zone number 801 to which the TT region belongs, the From (start) PBA 901 of the TT region, the To (end) PBA 902 of the TT region, the From (start) LBA 903 of the TT region and the To (end) LBA 904 of the TT region. The management of the From (start) PBA/LBA and the To (end) PBA/LBA for each TT region leads to the assignment of TT regions 301 disposed discretely in the PBA space as shown in FIG. 3 in successive addresses in the LBA space as shown in FIG. 4 or FIG. 5.

FIG. 10 is a table of the number of bands in each zone. The table of the number of bands in each zone defines how many bands described in FIG. 2 exist in each zone. Each entry includes the zone number 801, the number of bands 1001, and the cumulative number of bands from the start of the zone 1002.

Various data 721 stored in the main memory 702 of the disk drive include the data structure contained in FIGS. 8-10, the From (start) LBA and the To (end) LBA of the whole TT region or TT_FROM_LBA and TT_TO_LBA, the From (start) LBA and the To (end) LBA of the ST region or ST_FROM_LBA and ST_TO_LBA and the number of sectors constituting the band or SECTOR_PER_BAND and the like.

In some embodiments of the present invention, it is preferable that all the bands have the same capacity to facilitate the data management of the high-order device. In view of the characteristic of the band structure constituted by a plurality of ST, a simple change in the number of tracks constituting a band is not likely to be sufficient to equalize the capacity of each band located in different zones. Therefore, in this embodiment the capacity of band is determined by the SECTOR_PER_BAND, and the sectors in excess of the number of SECTOR_PER_BAND are made idle.

Figure 11:
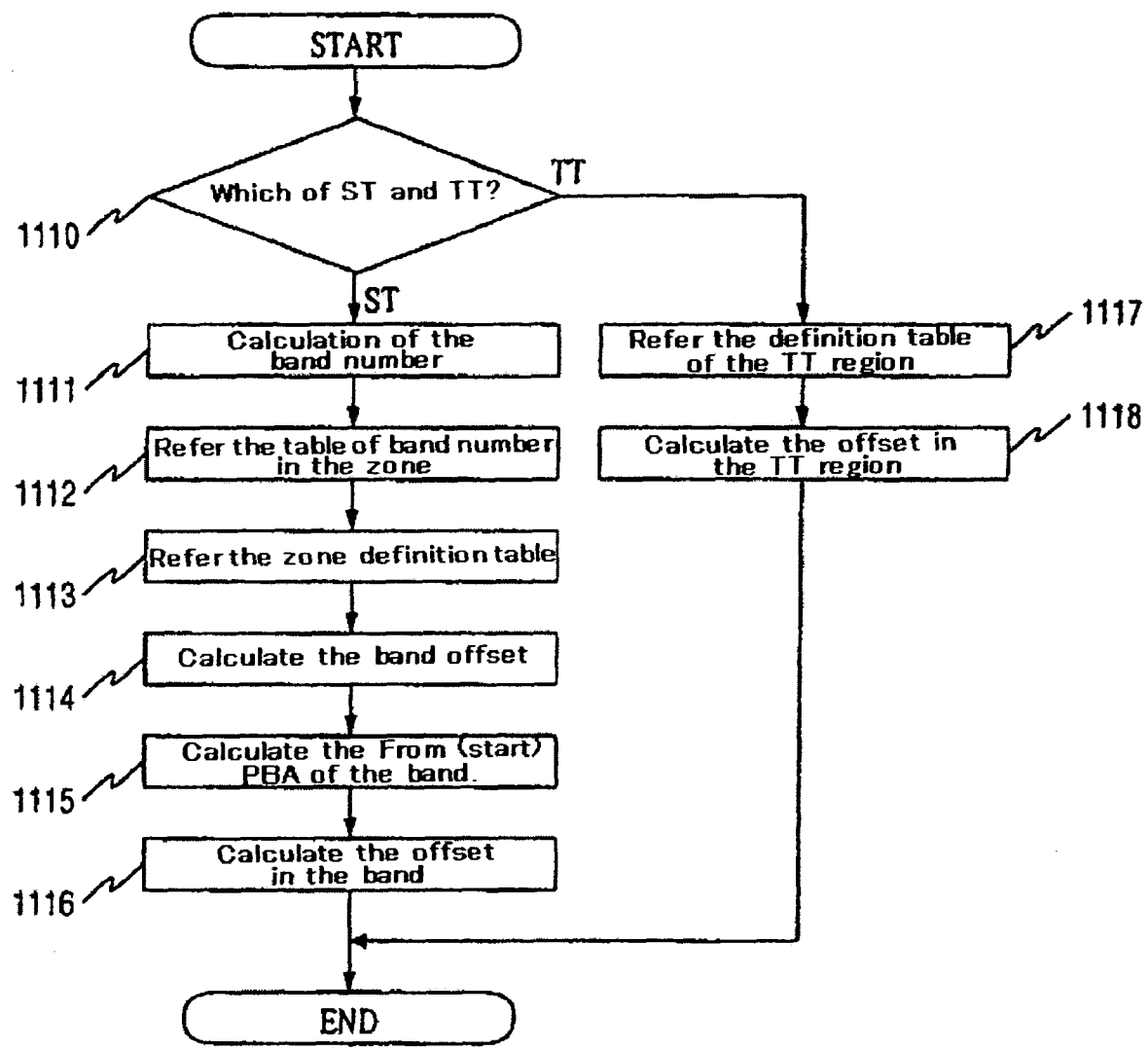
FIG. 11 is a flowchart of an address translation program from LBA to PBA according to the address assigning method in accordance with an embodiment of the present invention.

An address assigning method in accordance with an embodiment of the present invention and one of the control programs 722 used in an embodiment of the disk drive will be described with reference to FIG. 11. FIG. 11 is a flowchart of the address translation program from the LBA to the PBA, which is used to translate the LBA specified by the high-order device to the PBA or addresses on the storage medium of the disk drive.

In the step of starting process 1110, the question of which address of ST and TT is specified by the high-order device is determined by referring four variables: TT_FROM_LBA, TT_TO_LBA, ST_FROM_LBA, and ST_TO_LBA. If the LBA specified turns out to be the LBA of ST as a result of the determination, the process proceeds to the step 1111 and if it is the LBA of TT, the process proceeds to the step 1117.

In the step 1111, the band number to which the LBA to be accessed belongs will be calculated as described below. As ST are in the successive addresses after ST_FROM_LBA and the number of sectors contained in each band is indicated by SECTOR_PER_BAND, if the LBA is chosen as the value of the LBA to be accessed, the band number or BAND_ID can be calculated by the following formula. Here, the floor is the calculation of rounding down the decimal point to the nearest integer:

BAND_ID=FLOOR((LBA=ST_FROM_LBA)/SECTOR_PER_BAND)

After the step 1111 is completed, the process proceeds to the step 1112. In the step 1112, the zones belonging to the band having the BAND_ID are searched by referring the number of bands table in the zone. As the number of bands table of FIG. 10 shows the cumulative number of bands 1002, the zone number to which the band belongs or ZONE_ID can be obtained by comparing the band number calculated in the step 1111 and the cumulative number of the bands 1002 can be obtained. After the completion of the step 1112, the process proceeds to the step 1113.

In the step 1113, the From (start) PBA 802, the To (end) PBA 803 and the number of sectors in a track 804 of the zone of ZONE_ID are read by referring the zone definition table. After the completion of the step 1113, the process proceeds to the step 1114, and the offset of the bands subject to access from the start of the zone, or BAND_OFFSET is calculated based on the BAND_ID and the cumulative number of bands 1002 of the table of band numbers in the zone 1002. After the completion of the step 1114, the process proceeds to the step 1115.

In the step 1115, the From (start) PBA of the band BAND_ID or BAND_FROM_PBA is calculated by the following formula based on the BAND_OFFSET, SECTOR_PER_BAND, the number of sectors in a track read in the step 1113 or TRACK_PER_SECTOR. Here, ceil is a calculation of counting fractions below the decimal point to the nearest integer:

BAND_FROM_PBA=ceil(SECTOR_PER_BAND/TRACK_PER_SECTOR)*BAND_OFFSET

After the completion of the step 1115, the process proceeds to the step 1116. In the step 1116, the sector offset in the band BAND_ID or SECTOR_OFFSET is calculated as shown below:

SECTOR_OFFSET=LBA−ST_FROM_LBA−SECTOR_PER_BAND*BAND_ID

And the PBAs of the sectors to be accessed are calculated based on the BAND_FROM_PBA, SECTOR_OFFSET and the offset due to the defective sectors obtained from the PLIST or BAD_SECTOR_OFFSET as follows:

PBA=BAND_FROM_PBA+SECTOR_OFFSET+BAD_SECTOR_OFFSET

After the completion of the step 1116, the address translation process ends.

In the step 1117, the TT region to which the LBAs to be accessed belongs is identified based on the From LBA 903 and the To LBA 904 of the LBAs and the TT region by referring the TT region definition table, and the From PBA 901 and the To PBA 902 of the TT region are read. After the completion of the step 1117, the process proceeds to the step 1118. In the step 1118, the PBAs to be accessed are calculated based on the From LBA 903 of the TT region to be accessed or FROM_LBA, the From PBA 901 or FROM_PBA, and the offset due to the defective sectors obtained from the PLIST or BAD_SECTOR_OFFSET as follows:

PBA=LBA−FROM_LBA+FROM_PBA+BAD_SECTOR_OFFSET

After the completion of the step 1118, the address translation process ends.

This embodiment has described the case where the TT region and the ST region are assigned in a LBA space like the structure shown in FIG. 4 or FIG. 5. However, this can be easily expanded to the case where the TT region and the ST region are assigned to different logical drives as shown in FIG. 6. In such a case, it is enough to add a variable to manage to which logical units the TT region and the ST region are assigned. This embodiment also describes the case wherein the disk drive include two track groups of different track widths called the "TT region" and the "ST region." However, the present invention is not limited to the case where there are two different track groups, and can be easily expanded to the case of a disk drive having an arbitrary number of track groups.

In the case where the start address of the TT region and the ST region is fixed, the unused capacity of the disk drive can be increased by initially having the whole region of the disk drive as a TT region and by converting the TT region into the ST region depending on the unused capacity of the disk drive. For example, the following procedure may be used to convert the TT region into the ST region. (1) Convert the unused track group of the TT region into the ST region. (2) Copy the data recorded on the TT being used to the ST. (3) After confirming that a copy has been from the ST to the TT, change the state of the TT from "now under use" to "unused" and then return to (1).

The writing method of data into the disk drive according to another embodiment of the present invention will now be described.

According to an embodiment of the present invention, the sectors for storing the contents portion of a file having a file name beginning with a specific prefix are secured from the TT region.

Figure 14:
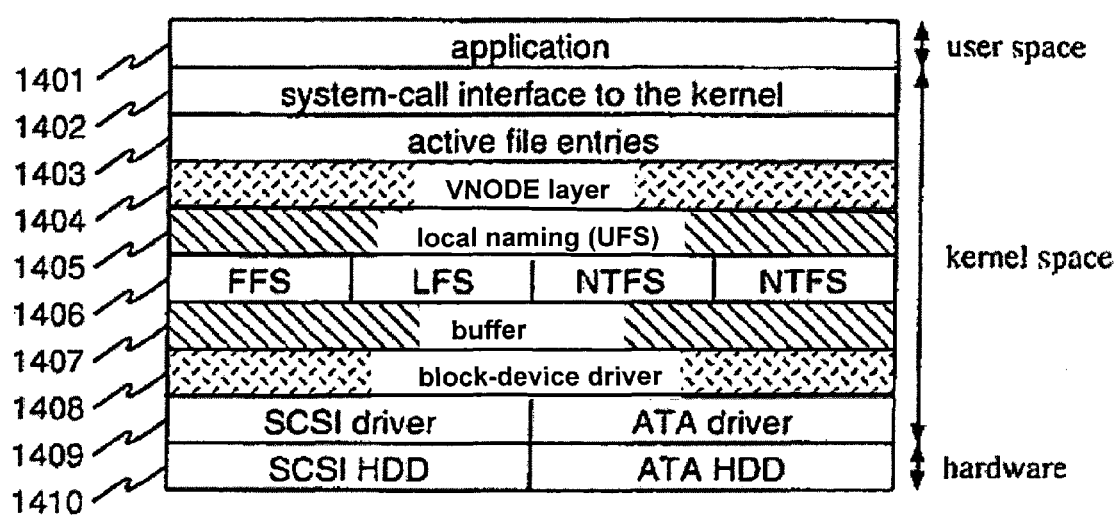
FIG. 14 is an illustration of the system hierarchy in accordance with an embodiment of the present invention.

The system hierarchy is described below with reference to FIG. 14. FIG. 14 showing the system hierarchy includes hardware, an operating system (OS), and applications. The user space wherein they can execute various programs is the application layer 1401. The kernel space wherein the OS operates extends from 1402 to 1409. 1402 represents the system call layer to the kernel, 1403 represents the active file entry layer, 1404 represents the VNODE layer, 1405 represents the local name layer, 1406 represents the file system layer, 1407 represents the buffer cache layer, 1408 represents the block device layer, and 1409 represents the device driver layer. The hardware such as disk drive constitutes the hardware layer 1410.

In order to efficiently deal with a plurality of file systems and a plurality of hardware, the OS abstracts software and hardware and enables the devices of higher layer to access the devices of lower layer without being aware of the difference in software and hardware. For example, the VNODE layer 1404 abstracts the file system layer 1406, and the block device driver layer 1408 abstracts the device driver layer 1409. Such abstraction enables the whole system to jointly own the resources and to make efficient use of memory and other resources. The local name layer 1405, the buffer cache layer 1407 and the like are examples of jointly owned resources.

Thanks to such abstraction layers and jointly owned resources, the OS can make efficient use of a plurality of files systems and hardware. However, such a structure of the OS makes it extremely difficult to support the disk drive of embodiments of the present invention wherein the TT region and the ST regions are mingled. The users of the disk drive of embodiments of the present invention are faced with the problem that the process of the application layer cannot access in harmony with the characteristics of the lower hierarchy due to the abstraction of the lower hierarchy such as the VNODE layer 1404 even if they wish to dispose rarely renewed files such as music, movie and the like in the ST region and dispose frequently renewed files such as database and the like in the TT region.

If an interface enabling the process of the application layer to access in harmony with the characteristics of the lower hierarchy should be added to the OS, a change to the virtualization layer or common resources is indispensable, and the change has an important impact on the whole system. In addition, a change of the interface results in the loss of compatibility with the prior system. As a result, a change in the interface to support the disk drive of certain embodiments involves a great risk, and it is unrealistic to request such a change to the OS vender.

In some embodiments, a file system enables the user program to make and write a file by specifying the TT region by using only the existing interface. As the interface with the upper layer and the lower layer is compatible with the prior ones, the replacement of only the file system portion enables to use the disk drive according to the embodiment 1 even if the prior OS is used therein. For making a file in the TT region, the file should be made under a file name to which a prefix named ".updatable_" is added at the top thereof. At this time, two file entries of both file names, one with the prefix and another without the prefix, are made for a file substance on the file system, and thereafter it will be possible to access the file substance made on the TT region by using whichever file name. This is another feature of this embodiment.

Figure 12:
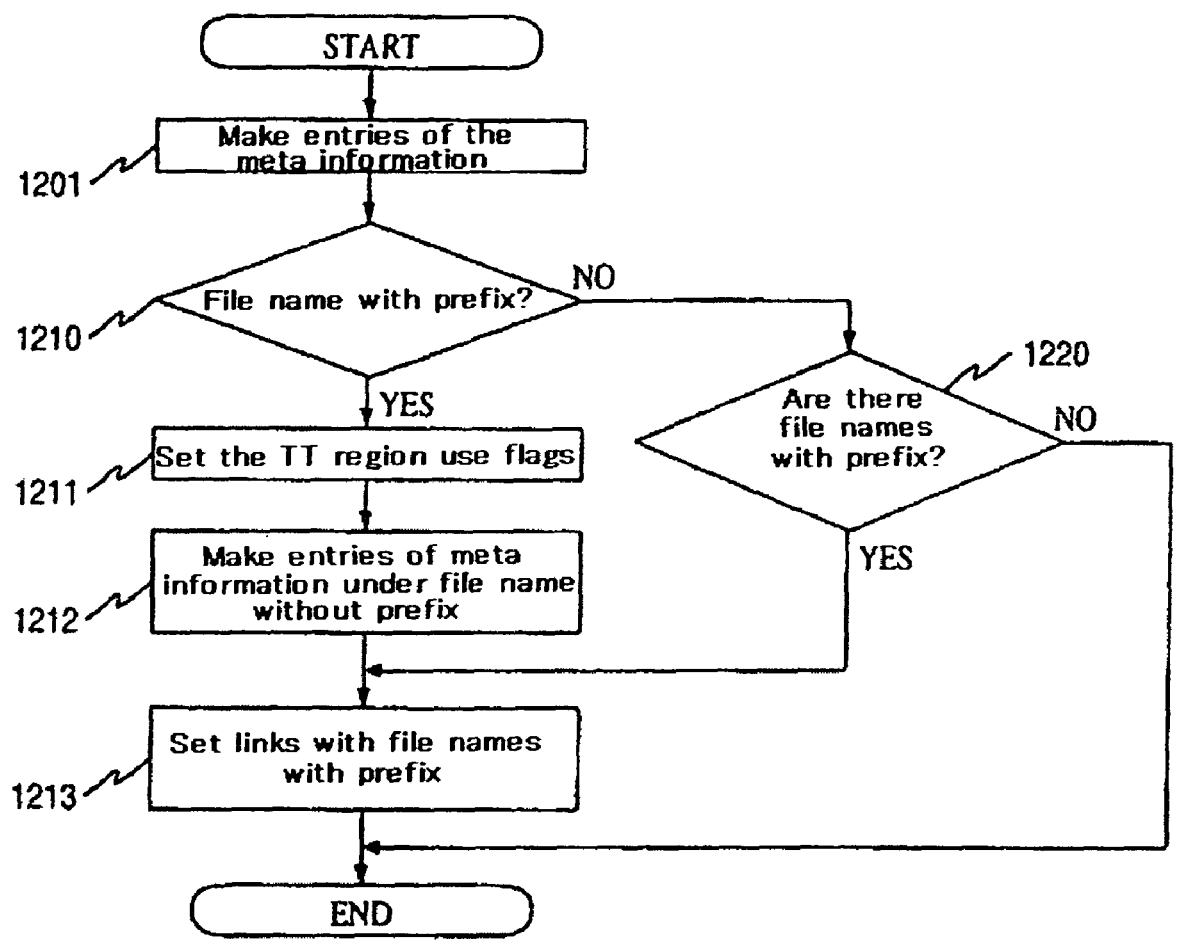
FIG. 12 is a flowchart of file-making method in accordance with an embodiment of the present invention.

FIG. 12 is a flowchart describing a file-making method according to an embodiment of the present invention. The file-making method is described with reference to FIG. 12. The start of the process is the step 1201, where a new entry of meta information or the management information of files under the file names specified by the users is made. After the completion of the step 1201, the process proceeds to the step 1210, where the question of whether the file name specified by the user is preceded by a prefix ".updatable_" is judged. If it has the prefix, the process proceeds to the step 1211, and if it has no prefix, the process proceeds to the step 1220.

In the step 1220, it will be confirmed whether the file name with the prefix added to the file name specified the user already exists or not. If it exists, the process proceeds to the step 1213, and when it does not, the process ends.

In the step 1211, the TT region use flags are set on the meta information entries made in the step 1201 so that the sectors available in the TT region may be used for writing in files. After the end of the step 1211, the process proceeds to the step 1212, where meta information with file names from which the prefix is removed is made. After the completion of the step 1212, the process proceeds to the step 1213, where the link with a file name without the prefix replacing that with a file name with the prefix is set on the meta information entries made in the step 1201. As a result of the measures taken in the step 1212 and the step 1213, files are written in the TT region even if the user program executes write operations under the file names without prefix thereafter. After the end of the step 1213, the process is terminated.

As the entries under the file name without prefix become accessible, even user programs not adapted to the disk drive of embodiments of the present invention can be used by making necessary file entries in advance. There are cases where, depending on the program, for renewing the existing files, old files are kept as they are after their name is changed and a new file is made under the same file name to write data therein. In this embodiment, a change in the file name without prefix when there are file names with prefix and those without prefix results in the cancellation of the link between the file name with prefix and the file name without prefix, and the meta information entry of a file name with prefix remains as it is while the substance or the contents of the file on the TT region do not exist and while the TT region use flags remain as they are set. A further attempt to make a new file name without prefix here is followed by, in the step 1220, the confirmation of whether there is any entry of meta information under a file name with prefix, and by, in the step 1213, the setting up of a link with a meta information entry under a file name with prefix. As a result, even if data are written again under a file name without prefix, it is certain that the contents will be stored on the TT region.

Figure 13:
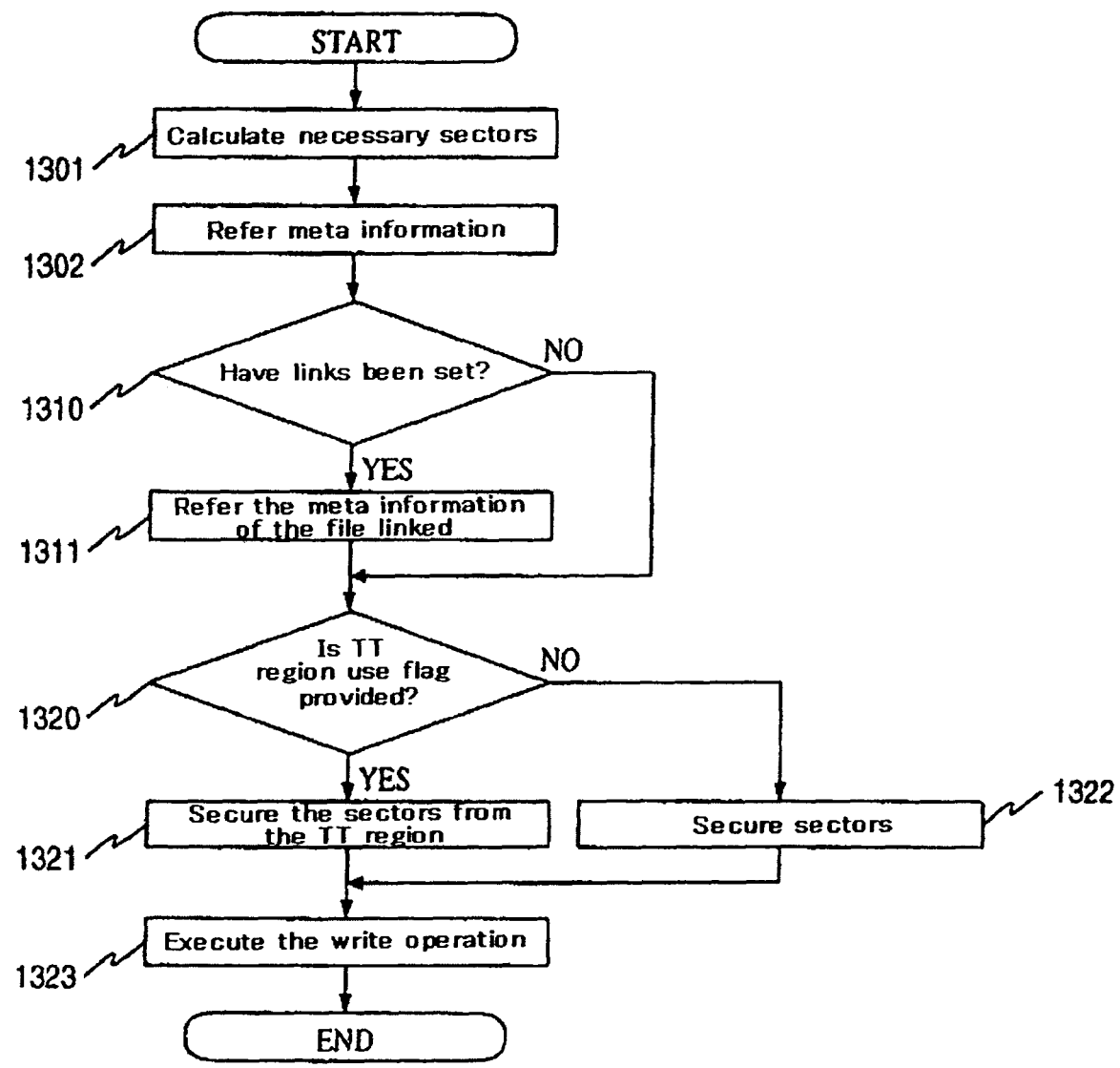
FIG. 13 is a flowchart of file-writing method in accordance with an embodiment of the present invention.

FIG. 13 is a flowchart describing the file-writing method according to an embodiment of the present invention. The file-writing method is described with reference to FIG. 13. The start of the process is the step 1301, where the number of sectors required to write the file contents is calculated. After the end of the step 1301, the process proceeds to the step 1302, where the meta information of the file under the file name specified by the user is read. After the end of the step 1302, the process proceeds to the step 1310.

In the step 1310, it will be judged whether a link has been established with the meta information. If the link has been established, the process proceeds to the step 1311, and if the link has not been established, the process proceeds to the step 1320. In the step 1311, the meta information of the file linked is read. After the end of the step 1311, the process proceeds to the step 1320.

In the step 1320, it will be judged whether the TT region use flags have been set in the meta information read in the step 1302 or the step 1311. If the TT region use flags have been set, the process proceeds to the step 1321, and if the TT region use flags have not been set, the process proceeds to the step 1322. In the step 1321, the sectors for storing the contents of files are secured from the TT region. After the end of the step 1321, the process proceeds to the step 1323. In the step 1322 the sectors for storing the contents of files are secured in the TT region or the ST region. After the end of the step 1322, the process proceeds to the step 1323, where the data specified by the user are written in the sectors secured in the step 1321 or the 1322.

In this embodiment, the case where a prefix ".updatable_" is added to the file name is described. As any file name beginning with "." is an invisible file depending on the type of OS, it is convenient for use as suggestive information for a file system as used in this embodiment. However, the method of the present invention is not limited to this method, and can be equally applied to any arbitrary prefix or suffix.

In this embodiment, the case of ordinary disk drive accessed by the LBA is described. However, this method can be easily expanded to the disk drives supporting the OSD. An example of expansion is the following method. By using OSD, it is possible to identify the data (objects) written on the disk drive by an object ID. The object wherein the value of a specific bit of the object ID is 0 is written in the TT region, and the object whose value of a specific bit is 1 is written in the ST region.

The present invention is effective for providing a large capacity of the disk drive and because of a small number of corrections required for the existing software in the case of writing a massive volume of data in one block, in the case where a large capacity is required, and in the case where databases frequently renewed for managing data must be stored for AV use or for back-up use.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A disk drive comprising:
a single disk-shaped storage medium;
a first track group having a first track width on said single storage medium;
a second track group having a second track width on said single storage medium;
a first address assigning means for assigning logical block addresses to said first track group;
a second address assigning means for assigning logical block addresses to said second track group, wherein
said first address assigning means assigns successive logical block addresses to said first track group;
said second address assigning means assigns successive logical block addresses to said second track group; and
means for identifying an object to be recorded in said storage medium by an object identifier, wherein
the object having the object identifier of a first specific pattern are recorded in said first track group, and the objects having an object identifier of a second specific pattern are recorded in said second track group.

2. The disk drive according to claim 1, comprising:
means for determining whether the object identifier is an object identifier of said first specific pattern or an object identifier of said second specific pattern by a value of a specific bit of the object identifier.

* * * * *